United States Patent [19]

Utner et al.

[11] 4,309,687
[45] Jan. 5, 1982

[54] RESISTANCE STRAIN GAUGE

[75] Inventors: Ferdinand Utner; Harald Vetter, both of Regensburg, Fed. Rep. of Germany

[73] Assignee: Siemens Aktiengesellschaft, Berlin & Munich, Fed. Rep. of Germany

[21] Appl. No.: 141,625

[22] Filed: Apr. 18, 1980

[30] Foreign Application Priority Data

Apr. 23, 1979 [DE] Fed. Rep. of Germany ....... 2916425

[51] Int. Cl.³ ............................................... G01L 1/22
[52] U.S. Cl. ........................................ 338/2; 338/292; 338/309
[58] Field of Search ........................................ 338/2-5, 338/275, 283, 287, 292, 293, 324, 325, 329, 307-309; 357/26; 73/720, 726

[56] References Cited

U.S. PATENT DOCUMENTS

| | | | |
|---|---|---|---|
| 2,252,464 | 8/1941 | Kearns, Jr. et al. | 338/2 |
| 2,632,831 | 3/1953 | Pritikin et al. | 338/325 X |
| 2,991,671 | 7/1961 | Bonn et al. | 338/2 X |
| 3,079,575 | 2/1963 | Singdale et al. | 338/2 |
| 3,202,951 | 8/1965 | Krinsky | 338/2 |
| 3,621,435 | 11/1971 | Stedman | 338/2 |
| 3,922,628 | 11/1975 | Hudson et al. | 338/2 |

FOREIGN PATENT DOCUMENTS 1114653  10/1961  Fed. Rep. of Germany .

Primary Examiner—C. L. Albritton
Attorney, Agent, or Firm—Hill, Van Santen, Steadman, Chiara & Simpson

[57] ABSTRACT

A resistance strain gauge in which a resistance layer is applied to a carrier and provided with terminal elements is particularly characterized in that a patterned, thin, non-self-bearing resistance layer is materially bonded to a synthetic layer, and that the resistance layer is overlapped by a patterned, solderable contact layer and is materially bonded to the contact layer.

6 Claims, 3 Drawing Figures

4,309,687

RESISTANCE STRAIN GAUGE

BACKGROUND OF THE INVENTION

1. Field of the Invention

The present invention relates to a resistance strain gauge in which a resistance layer is applied to a carrier.

2. Description of the Prior Art

Such a resistance strain gauge is known in the art from the German Pat. No. 2,534,433. Therein, a resistance strain gauge, electrically insulated from a spring material, is applied to the spring material, whereby the resistance spring gauge is formed out of a metal foil. Such a structure requires a significant expense when balancing the resistance strain gauge, because the adhesive layer required for bonding the metal foil must be relatively thick, due to the unevenness of the metal foil, among other things, and, therefore, leads to unpredictable influences of the adhesive on the transfer of the expansion from the spring to the resistance strain gauge. The balancing of such a resistance strain gauge must occur on the spring. Thereby, the specific data of the resistance strain gauge can no longer be faultlessly determined, because the very low changes of resistance which are to be evaluated for measuring the expansion or too greatly falsified due to influences of the spring, the ambient atmosphere and the synthetic layer. Accordingly, a function balancing of the individual unit can only occur according to the prior art in conjunction with the evaluation circuit.

SUMMARY OF THE INVENTION

The object of the present invention is to provide, given a resistance spring gauge of the type generally mentioned above, a resistance strain gauge which can be manufactured with great precision in mass production.

This object is achieved, according to the present invention, in that a patterned, thin, non-self-bearing resistance layer is materially bonded to a synthetic layer and that the resistance layer is overlapped by a patterned, solderable contact layer and is materially bonded to said contact layer.

A resistance layer which is materially bonded to a synthetic layer without an adhesive layer can be manufactured, for example, by means of vapor deposition or sputtering of metal onto a synthetic layer. Such a layer has the advantage that no adhesive layer is present between the synthetic layer and the resistance layer. A thin adhesive layer uniformly applied to the synthetic layer can serve for adhesion to a work piece. While this is directly connected to the relatively rigid test object, an adhesive layer which is applied between the resistance layer and the synthetic layer can influence the measuring result. Metal layers which are employed as resistance strain gauges according to the prior art produce a deformation of the insulating intermediate laminations as a result of the high expansion forces required. Thin metal layers of the type proposed herein, however, only require low expansion forces. The synthetic layer is not deformed due to the thin metal layer. The resistance strain gauges of the proposed type can be manufactured in series in the manner of a tape. Before being glued on, the characteristic data of the resistance strain gauges can be determined and, if needed, be balanced to the test object. The contacting due to the proposed contact layer, which overlaps the resistance layer, is faultlessly guaranteed by means of material bonding.

Advantageously, the resistance layer comprises chromium/nickel and the contact layer comprises copper. In order to protect against mechanical damage, a synthetic layer is advantageously arranged over the resistance layer. By doing so, the resistance strain gauge can be glued over its entire surface to the carrier; the pressure load when being glued does not damage the resistance layer.

In order to maintain temperature influences during soldering away from the exposed resistance layer, it is advantageous that the contact layer form contact surfaces and narrow paths which lead to the exposed resistance layers. These narrow paths can be designed relatively short since only a small amount of heat is required for soldering the relatively thin contact layers. Soldering can be advantageously carried out on these contact surfaces. The resistance layer advantageously exhibits a high surface resistance. Therefore, relatively broad paths can be formed. By doing so, the resistance strain gauge becomes less sensitive to slight damage given rough mechanical loads.

In order to reduce falsification of the measured result due to a transverse contraction of the resistance strain gauge as a result of the mechanical stress to be measured, at least one narrow strip of the contact layer is applied at right angles across the resistance layer. Due to its mechanical stability, this strip reduces a transverse contraction, since it only exhibits a very low expansion in the direction of the expansion to be measured, so that it only partially participates in the expansion. For manufacturing a resistance strain gauge according to the present invention, a method with the following features is advantageous. A resistance layer is applied to a metal layer provided as the contact layer. The resistance layer is stabilized and the synthetic layer is then laminated onto the resistance layer over the entire surface. Finally, the required patterns are generated in the contact layer and in the resistance layer by means of a selective etching process. Thereby, the synthetic layer and the adhesive need not exhibit a temperature stability sufficing for the operation of stabilization.

What is meant by selective etching is a method in which first, a congruent pattern is etched into both layers and in which further parts of the layer lying at the top are then etched away. This, for example upon employment of chromium/nickel as the material for the resistance layer, and of copper as the material for the contact layer, can be advantageously carried out.

Likewise advantageous is a method for manufacturing a proposed resistance strain gauge in which, first, a resistance layer is vapor deposited or dusted onto a synthetic layer, a contact layer comprising metal is then applied materially bonded and galvanically strengthened as needed, and that the required patterns are then generated in the contact layer and in the resistance layer by means of selective etching. Finally, the resistance layer is thermally stabilized.

Polyimide, which perfectly survives the temperature of at least approximately 200° C. required for the stabilization of the chromium/nickel layer is particularly suited as the synthetic layer.

Whereas the resistance strain gauges of prior art metal foils are bonded to an acrylic resin carrier, provided with cellulose fiber plys, by means of thick, relatively hard adhesive layers, so that the high expanssion forces can be transferred to the resistance strain gauge, a synthetic layer suffices as the carrier, given the thin, metallizations of the present invention. By doing so, these resistance strain gauges can be employed for significantly lower measured forces and can be dimensioned for increased sensitivity. The sensitivity can be set by means of the layer thickness.

Fundamentally, the layer thickness of the resistance layer is not limited toward the low end since it is not meant to be self-bearing, i.e., that it is so thin that its strength no longer suffices for processing in the form of a foil. Such a layer can be advantageously applied to a synthetic layer in that a chromium/nickel layer is vapor deposited or sputtered onto a copper foil and in that the synthetic layer is bonded to the chromium/nickel layer in the manner of a tape by means of a thin adhesive layer. In the tape method, adhesive layers can be applied so thinly and uniformly that they produce no disruptive measuring influences. In the tape method, the thin metal foils described, particularly ductile copper foils, can also be so smoothly laminated onto a synthetic foil that adhesion over the entire surface is achieved without the formation of disruptive agglomerations of adhesive.

If the resistance layer is vapor deposited or dusted onto a synthetic layer, then, advantageously, the contact layer will also be vapor deposited or dusted onto the resistance layer in the same vacuum and be subsequently galvanically strengthened.

A resistance layer that can be reailized particularly well is achieved by means of a chromium/nickel layer of 200 Å thickness. A 2000 Å thick copper layer is vapor deposited or dusted on as the contact layer and this copper layer is subsequently galvanically strengthened to approximately 3—5 μm.

According to the proposed method, for example, a surface resistance of 1000 ohm□ can be produced. Thereby, the scattering of the gauge factor, which indicates the change in resistance per change in length of the resistance gauge, can be kept within ±10% on a tape 30 m in length. This scattering corresponds to identical properties of a batch. From such a batch, circuits comprising a plurality of resistance strain gauges can be formed with the required precision, for example, the interconnection of four resistance strain gauges to form a full resistance bridge. The drift behavior, the temporal and temperature-dependent change of the resistance, is largely identical within a tape of the type described, so that a high zero stability is guaranteed, given the interconnection of a plurality of the resistance strain gauge.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
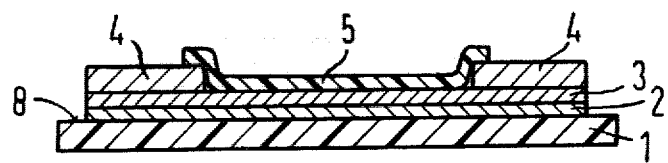
FIG. 1 is a sectional view of an exemplary embodiment of a resistance strain gauge constructed in accordance with the present invention.

A thin resistance layer 3 is materially bonded by way of an adhesive layer 2 to a synthetic layer 1. A pair of contact layers 4 are located on the resistance layer 3, the contact layers being formed of a metal layer materially bonded to the resistance layer 3. A synthetic layer 5 is provided to mechanically protect at least a resistance layer 3. Preferably, the synthetic layer 5 is materially bonded, preferably welded, to the synthetic layer 1 only in the nonmetallized marginal zone 8 which extends around the layer 1.

Figure 2:
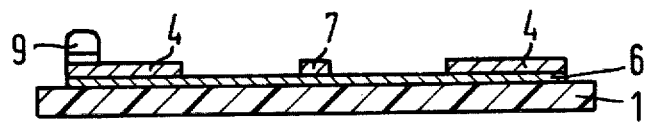
FIG. 2 is a sectional view of another embodiment of a resistance strain gauge constructed in accordance with the present invention.
Figure 3:
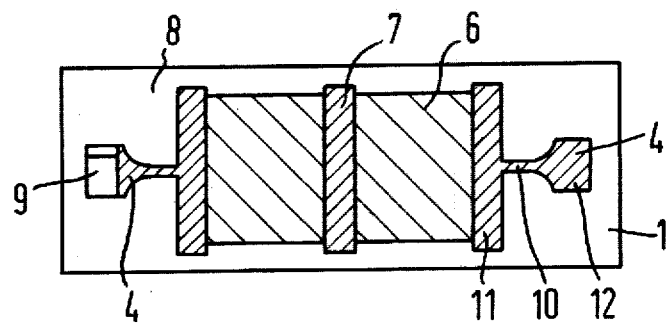
FIG. 3 is a plan view of a resistance strain gauge, according to FIG. 2, in which the resistance layer and the metal layer are illustrated with different hatching.

In FIG. 2, a resistance layer 6 and a patterned, solderable metal layer are applied to a synthetic layer 1 without intervening adhesive layers. The layers are materially bonded to one another. Preferably, the layers have been produced by vapor deposition or dusting of the resistance layer 6 and the patterned metal layer in the same vacuum. The patterned metal layer forms contact layers 4 and, as needed, transverse strips 7. It is significantly thicker than the resistance layer 6. The contact layer 4 includes a narrow region 10. The narrow region 10 connects the contacting zone 11, which is at least as wide as the resistance layer 6, to a contact surface 12 on which either direct terminal elements can be soldered or on which a solder support point 9 is arranged. (FIG. 3). The solder support point 9, for example, can be welded on or can be soldered on by means of solder having a high melting point. The synthetic layer 1 preferably consists of polyimide, since this material can withstand the high temperature load during soldering, during welding if needed, and in the required stabilization of the resistance layer.

The resistance strain gauge can be protected by a synthetic layer, such as the synthetic layer 5 of FIG. 1, and the synthetic layer can cover the entire device, with the exception of the contact surfaces. The protective synthetic layer is materially bonded to the synthetic layer 1, preferably in its non-metallized zone 8.

The strip 7 is so narrow that, due to its mechanical stability, it participates only slightly in the expansion of the resistance strain gauge. It therefore reduces a cross-contraction of the resistance strip 6. A meander structure, analogous to traditional resistance strain gauges, is also possible with this construction.

The proposed resistance strain gauge can be glued over its entire surface to a test object without particular difficulty. Since the force required for the expansion of the resistance layer is only very low, no shearing or other deformation of the synthetic layer 1 occurs, the latter requiring a function balance in traditional resistance strain gauges after the gauge has been glued on.

Although we have described our invention by reference to particular illustrative embodiments thereof, many changes and modifications of the invention may become apparent to those skilled in the art without departing from the spirit and scope of the invention. We therefore intend to included within the patent warranted hereon all such changes and modifications as may reasonably and properly be included within the scope of our contribution to the art.

We claim:

1. A resistance strain gauge comprising:
a synthetic layer;
a resistance layer on said synthetic layer;
terminals spaced apart on said resistance layer;

said terminals formed in a patterned, solderable contact layer carried on and bonded to said resistance layer; and at least one narrow metal strip bonded to and extending at right angles transversely of said resistance layer intermediate and spaced from said terminals for reducing cross-contraction of said resistance layer.

2. The resistance strain gauge of claim 1, wherein: said resistance layer comprises chromium/nickel material; and said contact layer comprises copper.

3. The resistance strain gauge of claim 1, and further comprising:
a covering of synthetic material covering said resistance layer.

4. The resistance strain gauge of claim 1, wherein: said contact layer comprises contact surfaces and narrow conductive paths extending from said contact surfaces to said resistance layer.

5. The resistance strain gauge of claim 1, wherein: said resistance layer has a high surface resistance and a meander shape.

6. The resistance strain gauge of claim 1, wherein: said contact layer includes a contact strip extending transversely of said resistance layer.

* * * * *